(12) United States Patent
Li et al.

(10) Patent No.: US 9,941,992 B2
(45) Date of Patent: Apr. 10, 2018

(54) METHOD AND APPARATUS FOR EFFICIENT NETWORK UTILIZATION USING SUPERCHANNELS

(71) Applicant: Futurewei Technologies, Inc., Plano, TX (US)

(72) Inventors: Guangzhi Li, Basking Ridge, NJ (US); Xiang Liu, Marlboro, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/265,679

(22) Filed: Sep. 14, 2016

(65) Prior Publication Data

US 2018/0076920 A1    Mar. 15, 2018

(51) Int. Cl.
*H04J 14/00* (2006.01)
*H04J 14/02* (2006.01)
*H04L 12/721* (2013.01)
*H04Q 11/00* (2006.01)
*H04B 10/27* (2013.01)

(52) U.S. Cl.
CPC .......... *H04J 14/0212* (2013.01); *H04B 10/27* (2013.01); *H04L 45/124* (2013.01); *H04Q 11/0005* (2013.01); *H04Q 11/0062* (2013.01); *H04Q 2011/009* (2013.01); *H04Q 2011/0016* (2013.01); *H04Q 2011/0086* (2013.01)

(58) Field of Classification Search
CPC .......... H04Q 11/0062; H04Q 11/0005; H04Q 2011/0016; H04Q 2011/009; H04Q 2011/0086; H04L 45/124; H04B 10/27
USPC .......................................... 398/48
See application file for complete search history.

(56) References Cited

U.S. PATENT DOCUMENTS

| 9,124,369 | B2 * | 9/2015 | Ji ........................ H04B 10/40 |
| 9,660,752 | B2 * | 5/2017 | Mitchell ............ H04J 14/0212 |
| 9,712,249 | B2 * | 7/2017 | Kim .................... H04B 10/548 |
| 2004/0028406 | A1 * | 2/2004 | Bortz ................ H04Q 11/0005 |
| | | | 398/49 |

(Continued)

FOREIGN PATENT DOCUMENTS

| WO | 9804058 A1 | 1/1998 |
| WO | 2005034568 A1 | 4/2005 |

(Continued)

OTHER PUBLICATIONS

Wright et al. "The Network Capacity Benefits of Flexgrid" ONDM 2013 Brest, France, pp. 7-12.

(Continued)

*Primary Examiner* — Juan A Torres
(74) *Attorney, Agent, or Firm* — Vierra Magen Marcus LLP

(57) ABSTRACT

The disclosure relates to technology for constructing an optical network. A central node is selected among a plurality of nodes in the optical network, and each of the nodes is connected to the central node via a set of superchannels, wherein each of the superchannels includes sub-carriers and has a same data rate. The network resources between the central node and each of the plurality of nodes are managed by dynamically allocating the sub-carrier bandwidths to support communication among the plurality of nodes via the superchannels, and wavelength selective switching is performed among the superchannels at the central node.

20 Claims, 13 Drawing Sheets

(56) References Cited

U.S. PATENT DOCUMENTS

| | | | |
|---|---|---|---|
| 2012/0201541 A1* | 8/2012 | Patel | H04J 14/0212 |
| | | | 398/58 |
| 2016/0057519 A1* | 2/2016 | Hand | H04Q 11/0066 |
| | | | 398/49 |
| 2016/0192042 A1* | 6/2016 | Mitchell | H04Q 11/0005 |
| | | | 398/48 |
| 2017/0019204 A1* | 1/2017 | Yilmaz | H04J 14/0221 |
| 2017/0214488 A1* | 7/2017 | Vassilieva | H04B 10/50 |

FOREIGN PATENT DOCUMENTS

| | | |
|---|---|---|
| WO | 2005104738 A2 | 11/2005 |
| WO | 2014078940 A1 | 5/2014 |

OTHER PUBLICATIONS

Frisken et al. "Flexible and Grid-less Wavelength Selective Switch using LCOS Technology" Optical Society of America, OSA/OFC/NFOEC 2011, 3 pages.
Duffield et al. "A Flexible Model for Resource Management in Virtual Private Networks" ACM SIGCOMM Computer Communication Review, vol. 29, Issue 4, Oct. 1999, pp. 95-108.
Bathula et al. "Constraint Routing and Regenerator Site Concentration in ROADM Networks" J. Opt. Commun. Netw., vol. 5, No. 11, Nov. 2013, pp. 1202-1214.
Chandrasekhar et al. "Transmission of a 1.2-Tb/s 24-Carrier No-Guard-Interval Coherent OFDM Superchannel over 7200-km of Ultra-Large-Area Fiber" Optical Communication, 2009. ECOC '09. 2 pages.
PCT/CN2017/101756, ISR, dated Dec. 18, 2017.

* cited by examiner

METHOD AND APPARATUS FOR EFFICIENT NETWORK UTILIZATION USING SUPERCHANNELS

BACKGROUND

In optical networks, signals may be transmitted at various wavelengths, with each wavelength corresponding to a transmission channel. Optical links may connect network nodes so that signals may be transmitted throughout the optical network. An optical path may use a series of network nodes and optical links to connect a source (e.g., a transmitter) of an optical transmission with a destination (e.g. a receiver) for the optical transmission.

With the advancements in technology, such as 5G mobility, 4K video, Internet of Things (IoT) communication and virtual reality (VR) games, new interactive applications will increasingly generate and consume enormous amounts of data. These large amounts of data in turn cause dramatic growth in network traffic, which requires larger bandwidth to minimize and reduce delays. In order to keep up with demands and ensure these new technologies are economically efficient and operationally simple, an increase in the total capacity of existing optical networks is necessary such that providers may continue to expand their network bandwidth while limiting their infrastructure investment.

BRIEF SUMMARY

In one embodiment, there is a method for constructing an optical network, including selecting a central node among a plurality of nodes in the optical network; connecting each of the plurality of nodes to the central node via a set of superchannels, wherein each of the superchannels includes a set of sub-carriers and has a bounded data rate; managing network resources between the central node and each of the plurality of nodes by dynamically allocating the sub-carrier bandwidths to support communication among the plurality of nodes via the superchannels; and performing wavelength selective switching among the superchannels at the central node.

In another embodiment, there is a non-transitory computer-readable medium storing computer instructions for constructing an optical network, that when executed by one or more processors, causes the one or more processors to perform the steps of: selecting a central node among a plurality of nodes in the optical network; connecting each of the plurality of nodes to the central node via a set of optical superchannels, wherein each of the superchannels includes a set of sub-carriers and has a bounded data rate; managing network resources between the central node and each of the plurality of nodes by dynamically allocating the sub-carrier bandwidths to support communication among the plurality of nodes via the optical superchannels; and performing wavelength selective switching among the optical superchannels at the central node.

In still another embodiment, there is an optical communication network, including a plurality of nodes connected to optical links; and a network manager comprising: a memory storage comprising instructions; and one or more processors coupled to the memory that execute the instructions to: select a central node among a plurality of nodes in the optical communication network; connect a set of nodes from the plurality of nodes to the central node via a corresponding set of superchannels, wherein each of the superchannels includes a set of sub-carriers and has a bounded data rate; manage network resources between the central node and each of the nodes in the set of nodes by dynamically allocating the sub-carrier bandwidths to support communication among the plurality of nodes via the superchannels; and perform wavelength selective switching among the superchannels at the central node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The disclosure relates to technology for selection of a central or hub node in an optical network having superchannel connections with wavelength selective switching capability.

An optical network is constructed by selecting a central node among other nodes in the optical network. Each of the nodes is connected to the central node via a set of superchannels, where each of the superchannels has a bounded data rate. Wavelength selective switching may then be performed among the superchannels at the central node.

Network resources between the central node and each of the other network nodes are managed by dynamically allocating bandwidth to support communication among the other network nodes via the superchannels. Connections between the central node and the other network nodes are flexible grid connection, where network resources may be managed among the superchannels by dynamically reassigning spectrum to the superchannels for spectrum defragmentation.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Figure 1:
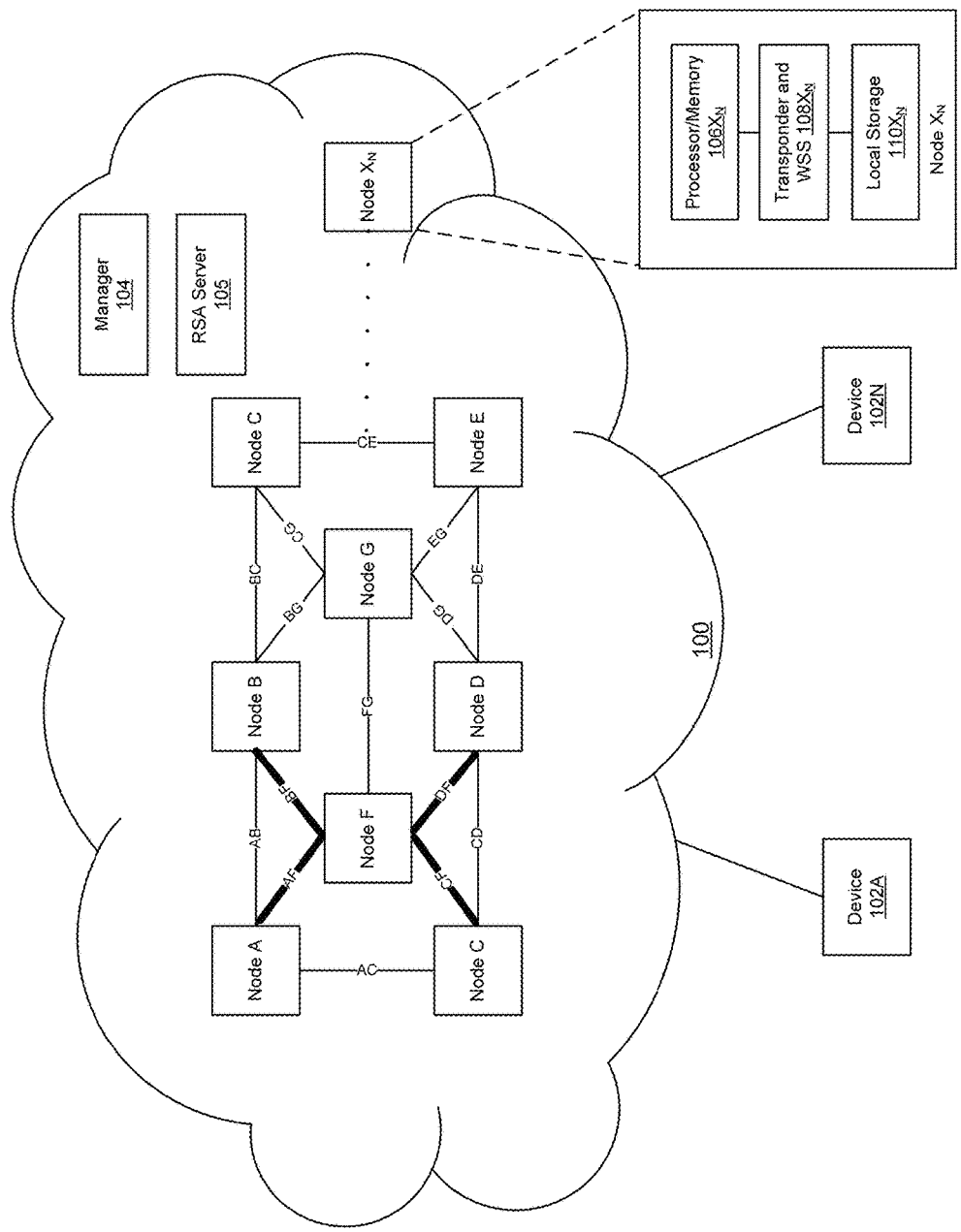
FIG. 1 illustrates an example network environment in accordance with the disclosed technology.

FIG. 1 illustrates an example network environment in accordance with the disclosed technology. The network is, for example, an optical communication network 100 capable of bandwidth variable wavelength switching. The optical communication network 100 includes, for example, multiple nodes (such as node A to node $X_N$, collectively nodes $X_N$), a manager 104 and connected devices 102A to 102N.

Optical communication network 100 may be implemented using various topologies (e.g., mesh, ring, etc.). Each of the nodes $X_N$ is a point in optical communication network 100. For example, node A may be an optical regeneration node, an optical transmitting/receiving node, or an optical switching node. Node A may be implemented, for example, as a dense wavelength division multiplexing (DWDM) system.

An exploded view of node $X_N$ shows that each node includes a processor/memory $106X_N$ having an interface configured to receive a traffic request of x sub-carriers of a superchannel (superchannels are described below in more detail with reference to FIG. 4). The node has transponders and bandwidth variable wavelength selective switches (WSSs) $108X_N$ configured to implement superchannels having sub-carriers. The transponders and WSS $108X_N$ are controlled by the processor/memory $106X_N$ which are configured to respond to the new traffic request starting a routing procedure. The node $X_N$ also has a local storage $110X_N$.

External routing and spectrum assignment (RSA) server 105 (which may also be internal to a node) includes a processor and memory (not shown) which may execute RSA algorithms as well as store network topologies, sub-carrier availability and spectrum availability. RSA server 105 may also be coupled to the nodes $X_N$ of the optical communication network 100 via an interface.

Each of the nodes $X_N$ may be connected with optical links, such as optical links AB, BC, CE, DE, CD, AC, AF, BF, CF, DF, FG, DG, EG, BG and CG. An optical link may be an optical fiber, an optical channel, an optical super-channel, a super-channel group, an optical carrier group, a set of spectral slices, an optical control channel, an optical data channel, and/or any other optical signal transmission link that communicatively couples one node $X_{N1}$ to another node $X_{N2}$.

In one embodiment; an optical link may be an optical superchannel that includes multiple channels multiplexed together using wavelength-division multiplexing (WDM) or DWDM in order to increase transmission capacity. Various quantities of channels may be combined into superchannels using various modulation formats to create different superchannel types having different characteristics. Additionally, or alternatively, an optical link may be a superchannel group. A super-channel group may include multiple superchannels multiplexed together using WDM or DWDM in order to increase transmission capacity.

Devices 102A to 102N may communicate with the optical communication network 100. The devices 102A to 102B may include, for example, a portable device, a handheld device, a mobile device, a stationary device, a vehicle-based device, or some other type of user device. Additionally, or alternatively, devices 102A to 102N may correspond to a non-user device, such as, a meter, a sensor, or some other device that is capable of machine-to-machine (M2M) communication.

Manager 104 manages the configuration of optical communication network 100 and enables administrators to monitor, configure, etc., the optical communication network 100. Manager 100 may identify network state information, resource availability and resource allocation, and/or other parameters relating to optical communication network 100. Manager 100 may be implemented in a centralized or a distributed fashion.

As appreciated, the depicted embodiments are non-limiting and any number of devices, nodes and/or optical links may exist in the optical communication network.

Figure 2:
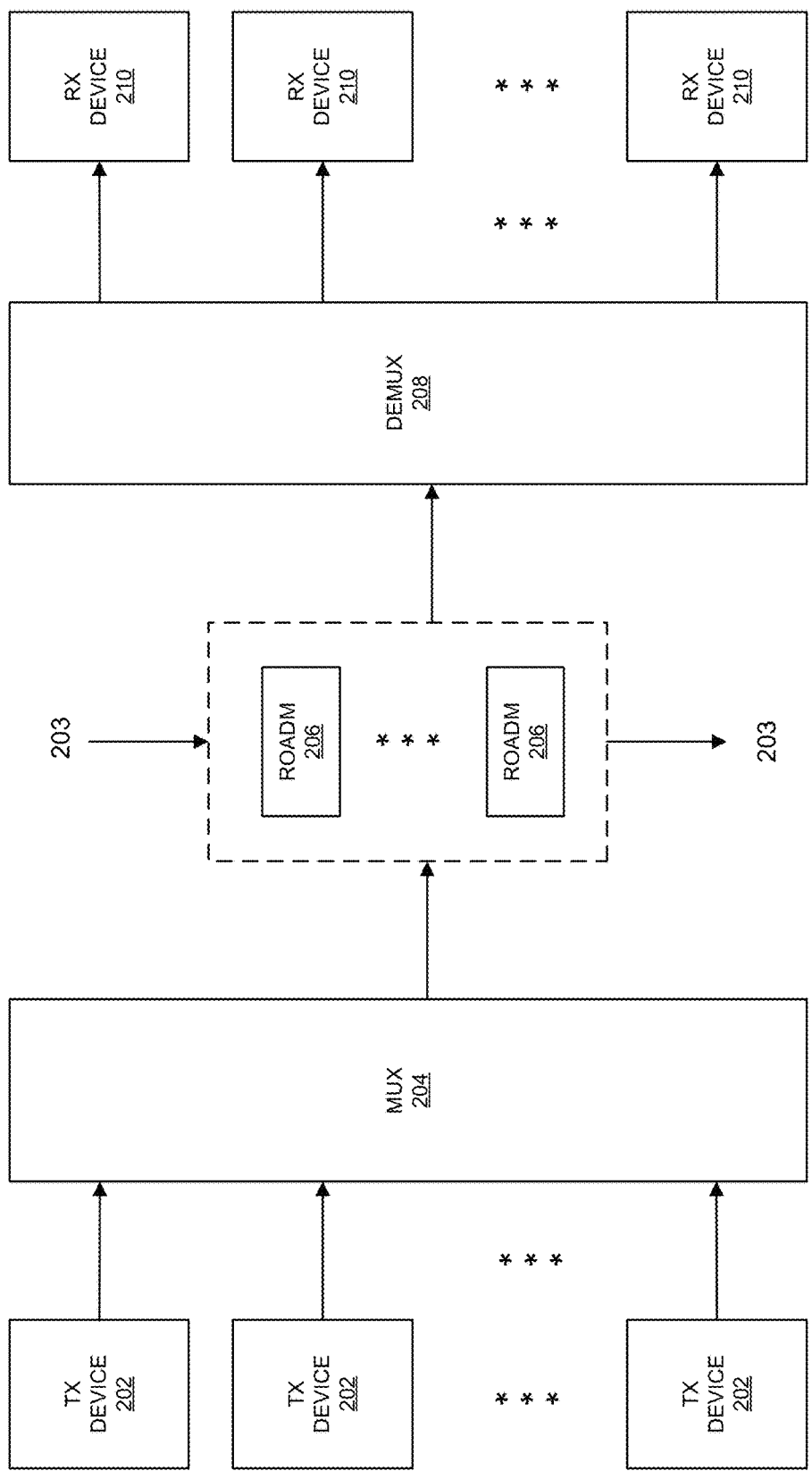
FIG. 2 illustrates example devices and components of the optical communication network in FIG. 1.

FIG. 2 illustrates example devices and components of the optical communication network in FIG. 1. One or more devices may operate within optical communication network 100 (FIG. 1) and may correspond to one or more network devices 102N and/or one or more optical components of a network device 102N. As illustrated, the optical communication network devices and components may include a set of transmitter devices 202, one or more superchannels 203, one a multiplexer 204, one or more reconfigurable optical add-drop multiplexers (ROADMs) 206, a demultiplexer 208 and one or more receiver devices 210.

Transmitter devices 202 may include, for example, an optical transmitter and/or an optical transceiver that generates an optical signal. In one embodiment, transmitter devices 202 may include a laser associated with each wavelength, a digital signal processor to process digital signals, a digital-to-analog converter to convert the digital signals to analog signals, a modulator to modulate the output of the laser, and/or a multiplexer to combine each of the modulated outputs (e.g., to form a combined output or WDM signal). One or more optical signals may be carried as a superchannel 203. In another embodiment, a single transmitter device 202 may be associated with one or more single superchannels 203. In still another embodiment, multiple transmitter devices 202 may be associated with a single superchannel 203. The transmitter devices may also include a multiplexer (MUX) 204 (which is illustrated separately).

MUX 204 may include, for example, an optical multiplexer (e.g., a power multiplexer, a WSS-based multiplexer, a multi-cast multiplexer, etc.) that combines multiple input superchannels 203 for transmission via an output fiber.

ROADM 206 (or an OADM) may multiplex, de-multiplex, add, drop, and/or route superchannels 203 into and/or out of a fiber. As illustrated, one or more ROADMs 206 may drop superchannel(s) 203 from a fiber, and may allow superchannel(s) 203 to continue propagating toward receiver devices 210 and/or another ROADMs 206. Similarly, ROADMs 206 may add superchannel(s) 203 to the fiber. Superchannel(s) 203 may propagate to a demultiplexer (DEMUX) 208 and/or another ROADM 206.

DEMUX 208 may include, for example, an optical demultiplexer (e.g., a power demultiplexer, a WSS-based demultiplexer, etc.) that separates multiple superchannels 203 carried over an input fiber. For example, demultiplexer 208 may separate superchannels 203 and may provide each superchannel 203 to a corresponding receiver device 210.

Receiver devices 210 may include, for example, an optical receiver and/or an optical transceiver that receives an optical signal. In one embodiment, receiver devices 210 may include the afore-mentioned DEMUX. One or more optical signals may be received by the receiver devices 210 via superchannel 203. Receiver device 210 may convert a superchannel 203 into one or more electrical signals, which may be processed to output information associated with each data stream carried by an optical channel included in superchannel 203. Similar to the transmitter devices 202, a single receiver device 210 may be associated with one or more superchannels 203 or multiple receiver devices 210 may be associated with a single superchannel 203.

Recent advances within the optical industry have introduced electronic switching using an opaque optical transponder on top of ROADM, which provides an optical data unit (ODU) of 1.25 Gbps switching capability. Implementation of such electronic switching in an optical network is commonly referred to as an optical transport network (OTN) switch. In one embodiment, the OTN switch includes an optical-electrical-optical (OEM) switching capability. In one example, an OTN switch receives 100 Gbps wavelength channels from ROADMs 206, disassembles the wavelength channels into multiple 1.25 Gbps sizes, repacks the 1.25 Gbps sizes to a 100 Gbps traffic rate and transmits the repacked data rate to ROADMs 100 Gbps wavelengths to the next OTN switch via the ROADM 206 network. The OTN layer performs traffic aggregation and smaller granularity switching. Using this approach improves ROADM wavelength utilization, eliminates wavelength blocking, and can reduce network operation cost since end-user services can be automatically provisioned at OTN layer.

As wavelength channels evolve from single carrier (e.g., 100 Gbps) to multicarrier superchannels (e.g., 500 Gbps), each subcarrier may carry 10G or more data rates. Once digital grooming has formed a superchannel, it becomes most cost-effective for that superchannel to optically pass through intermediate ROADMs and terminate only at its end point, where subcarriers will be extracted and switched in electronic switch of coarse granularity, e.g. 10 Gbps. In this regard, ROADMs enable superchannels to be easily switched and reconfigured to minimize optical switch cost, while coarse granularity electronic switching maximizes bandwidth efficiency and operation flexibility.

To maximize efficiency, the optical communication network 100 (i.e., flexible grid optical communication network) may deploy network nodes that support multilayer switching, including optical superchannel switches and electronic subcarrier switches. However, not all ROADMs 206 require electronic subcarrier switches. Rather, as described below, utilizing a dependence graph of a flexible grid network with link distances and superchannels, an optimal number of ROADMs 206 with subcarrier switches may be employed such that between any two nodes there is a superchannel path.

As appreciated, the number and arrangement of devices illustrated are non-limiting and examples. There may be additional devices, fewer devices, different devices, or differently arranged devices.

Figure 3:
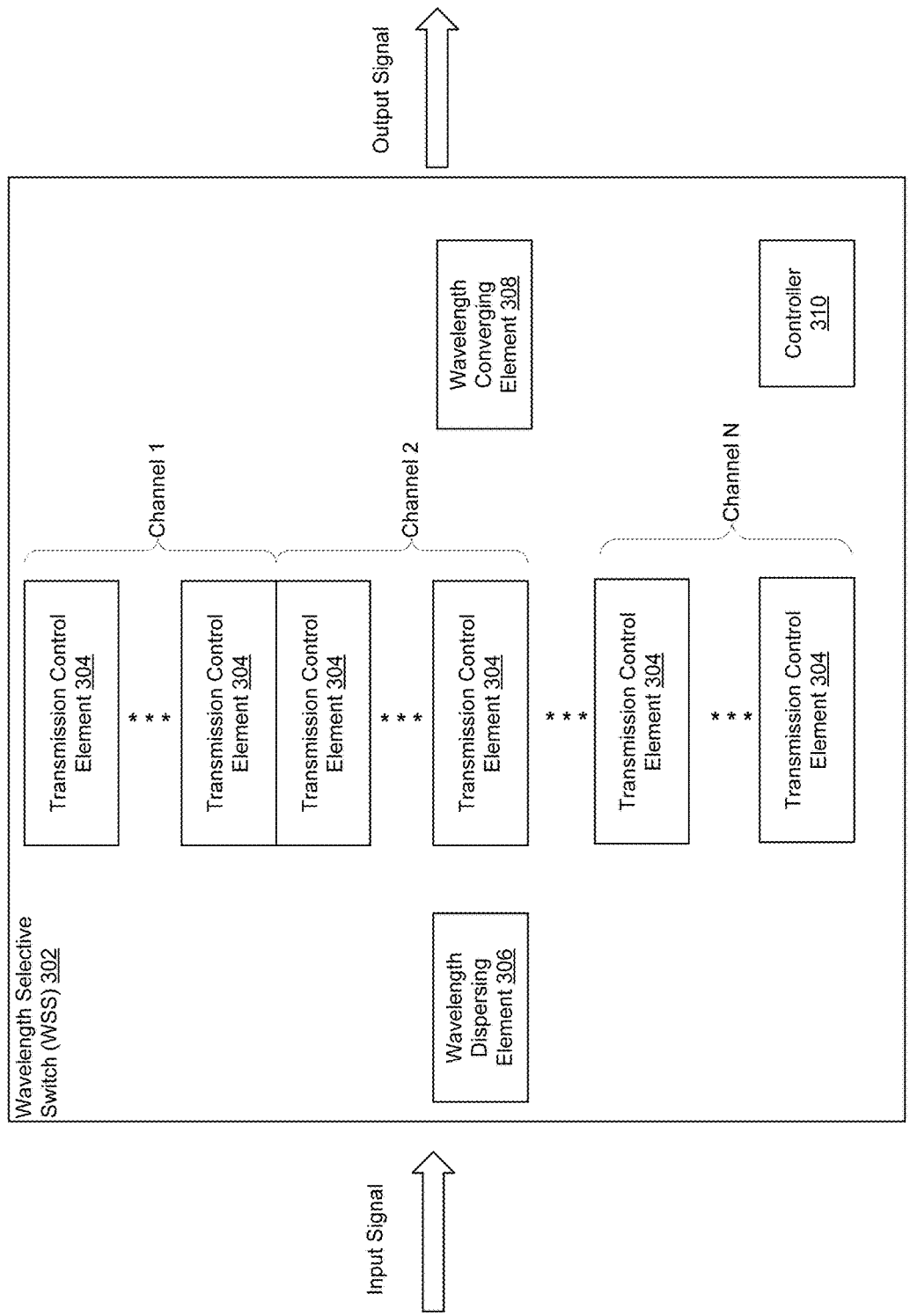
FIG. 3 illustrates a wavelength selective switch for implementation in the network of the disclosed embodiments.

FIG. 3 illustrates a wavelength selective switch for implementation in the network of the disclosed embodiments. A wavelength selective switch (WSS) 302 provide an optical cross-connect function with single channel granularity, where any WDM or DWDM channel from any of the N inputs can be routed to any of the N outputs. Although a single WSS is depicted, it is appreciated that one or more WSSs may be employed in the network. The WSS may be internal to a particular node or external to a node in the network.

WSS 302 includes, for example, a wavelength dispersing element 306, a wavelength converging element 308, transmission control elements 304 and controller 310. The wavelength dispersing element 306 performs wavelength dispersion of an input signal (i.e., light signal). The transmission control elements 304 each divide the input signal into wavelength bands within a channel band (i.e., channel 1, channel 2 . . . channel N) and transmit or cut off the divided input signal. The wavelength converging element 308 converges the signal of each wavelength produced from the transmission control elements 304 for output. The controller 310 controls a transmittance of the transmission control element 304 of at least one of the low and high frequency sides in a channel band.

Figure 4A:
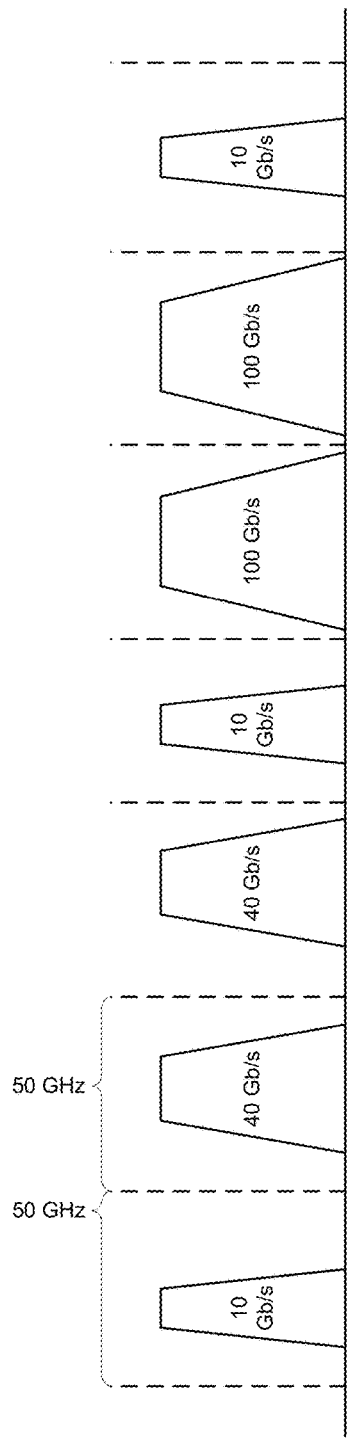
FIGS. 4A and 4B illustrate a fixed grid network and flexible grid network spectrum, respectively.
Figure 4B:
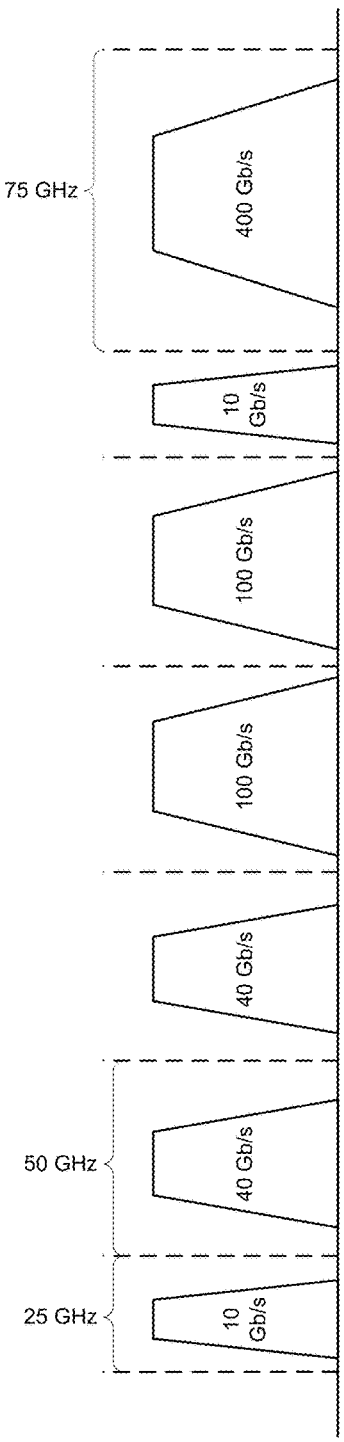

FIGS. 4A and 4B illustrates superchannels based on a fixed-grid and flexible-grid channel bandwidth allocation scheme. A superchannel (or optical superchannel) increases fiber channel capacity in optical networks, i.e. 400 Gb/s or 1 Tb/s per channel, by combining multiple optical subcarriers to create a composite optical signal exhibiting a desired capacity. Advantageously, optical superchannel technologies may provide increased capacity sufficient to support the increasing video and mobile traffic demands imposed on networks, such as the Internet. For example, With reference to FIG. 4A, fixed grid networks comprise a fixed amount of spectrum (e.g., 50 GHz) being allocated to every channel and the center frequency of a channel remains fixed. Such a fixed channel grid may not be sufficient to support the above-noted superchannels which operate at 400 Gbps or 1 Tb/s. For example, 50 GHz of spectrum is not sufficient for 400 Gbps and 1 Tb/s channels which require 75 GHz and 150 GHz of spectrum, respectively.

With reference to FIG. 4B, flexible grid (flex-grid) networks remove the fixed channel grid restriction and allow non-uniform and dynamic allocation of spectrum. Channels with finer granularity can be supported by using Orthogonal Frequency Division Multiplexing (OFDM) modulation scheme with variable subcarrier assignment. Such channels are referred to as flexible channels. For example, the flexible grid can allocate spectrum into a number of different (i.e., flexible) amounts (e.g., 10 GHz, 40 GHz, 100 GHz, 400 GHz) for every channel.

Figure 5A:
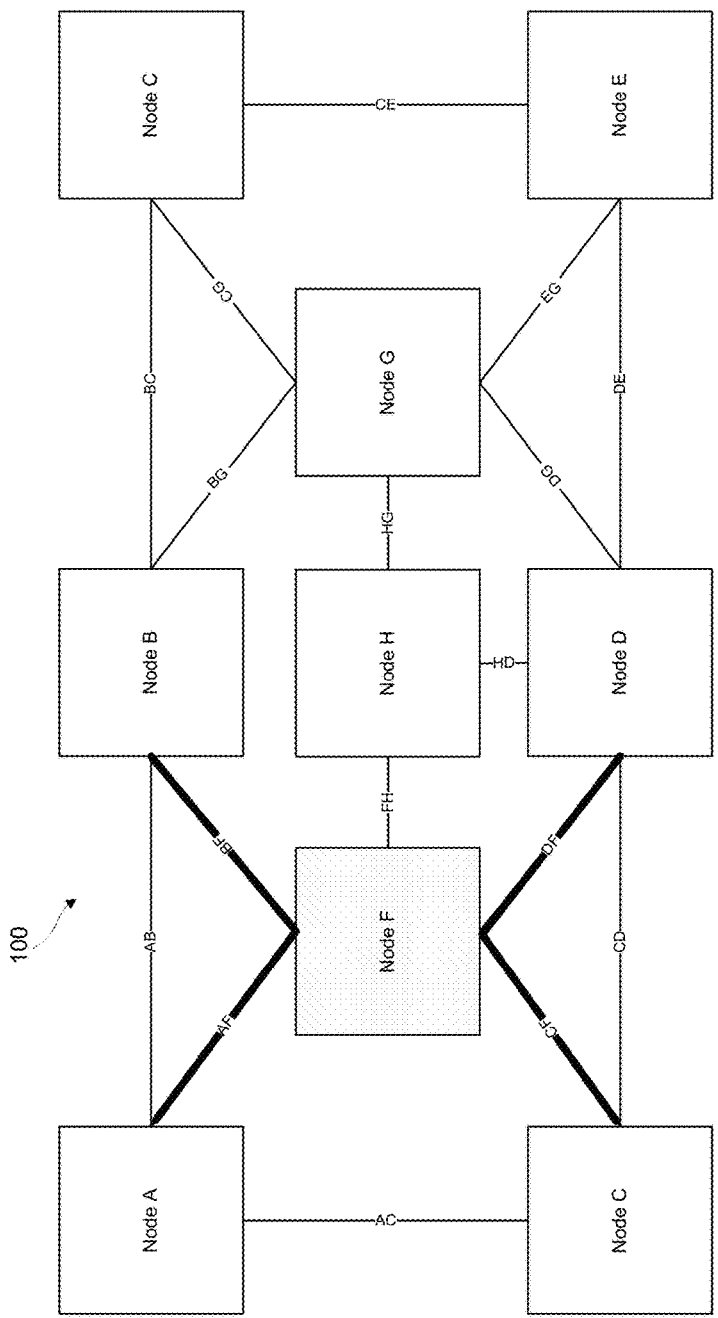
FIGS. 5A, 5B and 5C illustrate an example optical communication network with a central node and superchannels.
Figure 5B:
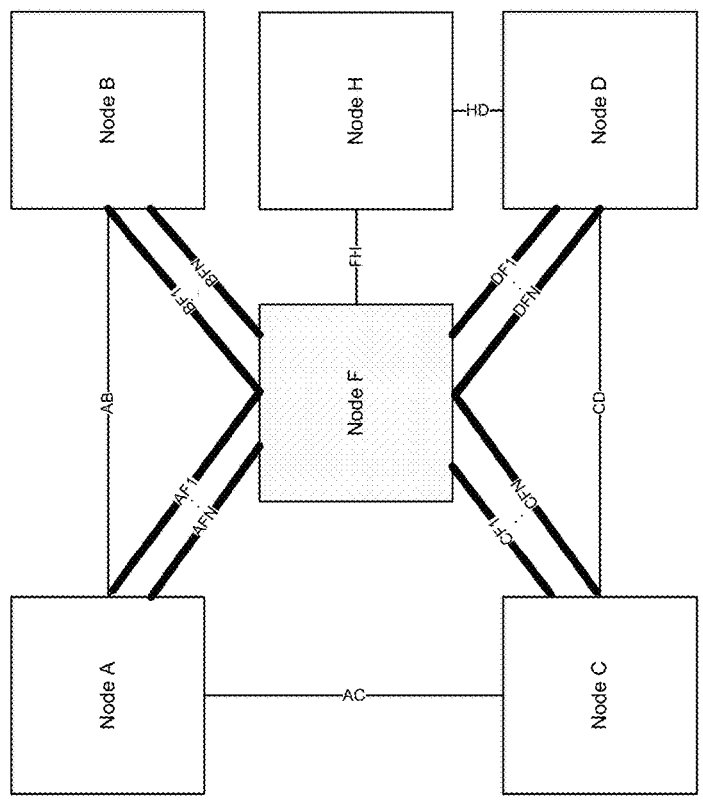
Figure 5C:
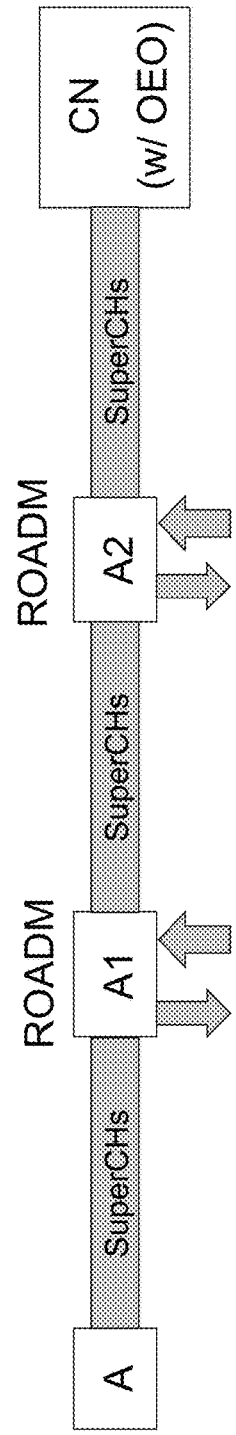

FIGS. 5A, 5B and 5C illustrate and example optical communication network with a central node and superchannels. As illustrated, the example optical communication network 100 (e.g., service provider network) includes a network of nine (9) nodes A-H, where each node is connected to one or more other nodes via a respective one of seventeen (17) optical links (similar to the links described above with reference to FIG. 1).

For purposes of discussion, let us assume that a customer of the service provider has four (4) sites represented by nodes A, B, C, and D, where each site has a total incoming and outgoing traffic maximum of 300 Gbps. The customer network (nodes A, B, C and D) is connected to central node F (selection of a central node will be discussed below with reference to FIG. 6) via four (4) superchannels AF, BF, CF and DF.

In one embodiment, there may be one or more superchannels between the customer network nodes A, B, C and D and the central node F. In one example, each superchannel is a point-to-point link with flexible grid ROADMs, as shown in FIG. 5B.

In another embodiment, as illustrated in FIG. 5C, the connection between a given node (A), such as nodes A, B, C and D in FIG. 5A, and the central node (CN), such as central node F in FIG. 5A, is a point-to-point flexible-grid connection with multiple intermediate nodes (e.g., A1 and A2). Each of the intermediate nodes may include a flexible ROADM that can drop a plurality of superchannels and add another plurality of superchannels. In another embodiment, multiple superchannels that are present in the connection between node A and the center node CN are periodically rearranged for spectrum defragmentation, wherein the spectrum degragmentation comprises defining a fragmentation parameter and assigning an operating spectrum with a least fragmentation value along the superchannels.

During implementation, traffic between any two nodes in the customer network could be in any pattern, as long as the total maximum bandwidth (in this example, 300 Gbps) is not exceeded. That is, the total bandwidth between the four optical links in the customer network may not exceed the total bandwidth of the superchannel. For example, a traffic pattern may be represented by any one of the following traffic matrices: pattern 1 matrix (most uniform distribution), pattern 2 matrix (most non-uniform distribution), and pattern 3 matrix (a random distribution). It is appreciated that the illustrated traffic matrices are non-limiting and intended to be examples of traffic patterns.

The efficiency of a central node topology is evident from the number of optical links (i.e., superchannels) that are formed between the nodes A, B, C, and D in the customer network when compared, for example, to a conventional full mesh topology network. In a full mesh topology network, in which each node is connected directly to each of the others, six (6) optical links are required in order to handle the maximum traffic load of 300 Gbps. In contrast, if a central node topology network is employed, in which each of the customer network nodes A, B, C and D are connected to a central node F, only four (4) optical links are necessary. The total number of optical links (i.e., superchannels) is changed from quadratic order to linear order of number of nodes.

In one embodiment, the customer network may also comprise a virtual private network (VPN) in which a hose model is employed. Applying the hose model to the optical communication network 100, one VPN endpoint (i.e., node) can communicate with additional VPN endpoints (i.e., other nodes) through a single connection (e.g. optical link), where each VPN endpoint specifies its aggregate ingress and egress bandwidth requests. The ingress bandwidth for a VPN endpoint specifies the incoming traffic from all of the other VPN endpoints into the VPN endpoint, while the egress bandwidth is the amount of traffic the VPN endpoint can send to the other VPN endpoints.

The hose model is scalable since the customer manages the allocated bandwidth at per flow basis at the network edge while the VPN provider, which sets up the network, is concerned with the flow aggregates inside the network. See, for example, N. Duffield et al., "A flexible model for resource management in virtual private networks," in Proc. ACM SIGCOMM, 1998, pp. 95-108, the contents of which are hereby incorporated by reference.

In an optical network, such as optical communication network 100, an optical channel will occupy fiber capacity even if there is no traffic in the optical channel. Thus, in a full mesh topology network for a multi-site VPN in an optical network is not economically feasible. Instead, a central node may be selected and superchannels formed between each node A, B, C and D and the central node F. The central node F provides high data rate switching, using for example the WSS 302 in FIG. 3, thereby transforming the superchannel non-applicable application to a superchannel applicable application, i.e. the bandwidth between any two nodes may not qualify for a superchannel, but the combined bandwidth from one node to each of the other nodes is large enough for a superchannel. Furthermore, the hose model traffic constraints ensure that the superchannel size can be fixed even though the traffic flowing therein may be dynamic.

Figures 6, 7A:
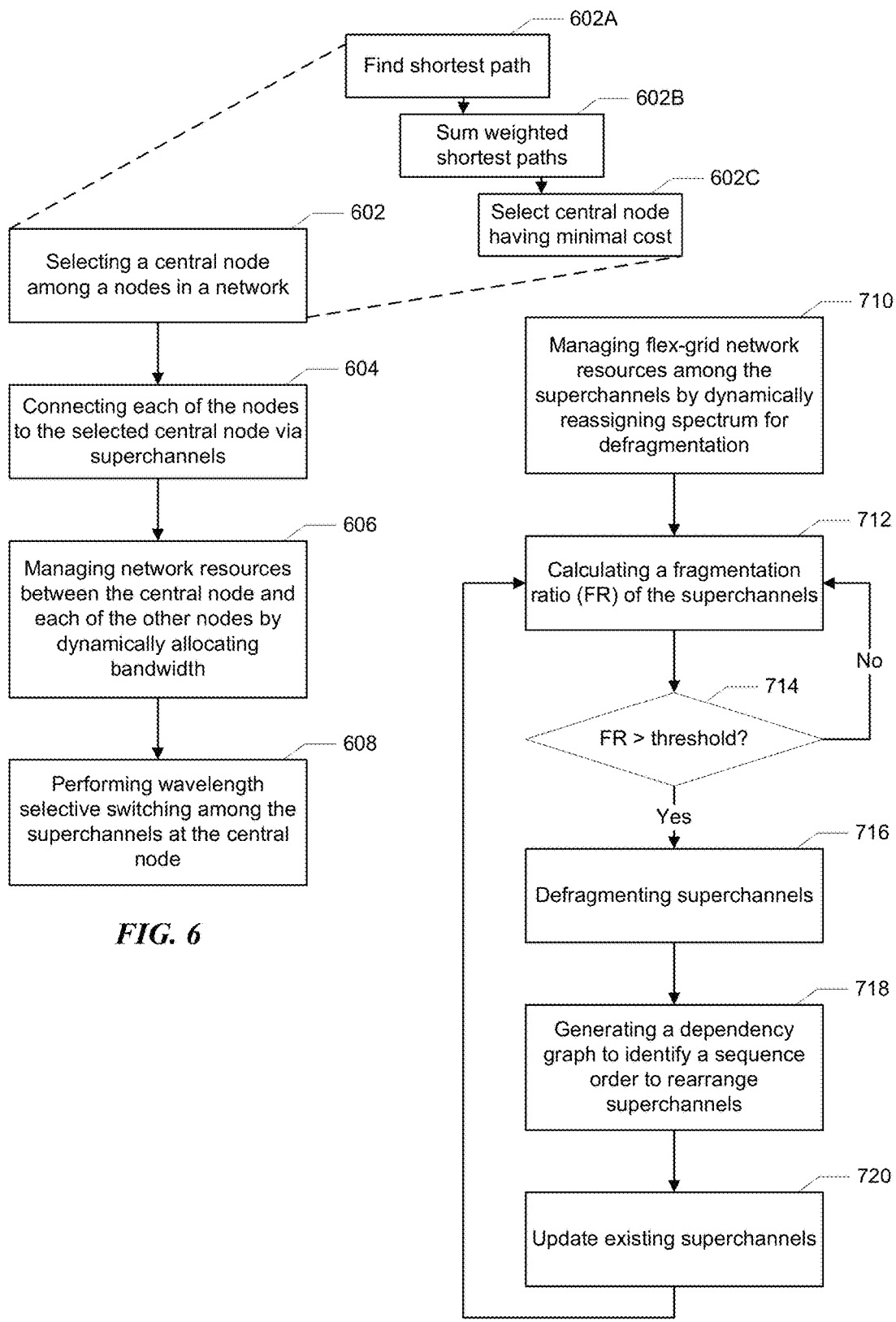
FIG. 6 illustrates a flow diagram of constructing a network with a central node in accordance with FIGS. 1-3 and 5.
FIG. 7A illustrates a flow diagram to reassign spectrum in a superchannel for defragmentation.

FIG. 6 illustrates a flow diagram of constructing a network with a central node in accordance with FIGS. 1-3 and 5. The process described in the diagram may be implemented in a distributed manner using any one or more of the components and devices discussed herein. For purposes of discussion, the process is implemented by a node $X_N$.

At 602, one of nodes $X_N$ selects a central node (such as central node F in FIG. 5) among the nodes $X_N$ in FIG. 1. While any number of algorithms may be employed to determine a central node (based on distance, cost, etc.), in one embodiment, the central node F is selected based on minimal cost.

At 602A, the node $X_N$ finds the shortest path from node F to each of the end point nodes. Continuing with the example of FIG. 5, to determine the central node F, the node $X_N$ finds the shortest path between each of the customer network nodes A, B, C and D (end point nodes) and each of the other nodes in provider network. At 602B, node $X_N$ sums a weighted shortest path from each of the other nodes in the provider network to each of the customer network nodes A-D. The node in the provider network having the minimal cost (k) will be selected by node $X_N$ as the central node F at 602C.

For example, and more specifically, the end point nodes include customer nodes A, B, C and D. If a network with N nodes exists, each node has a K(i) Gbps (i=1, . . . , n) bandwidth hose constraint. The goal is to find a central (optimal) node H to place an electronic subcarrier switch and establish a superchannel from each node i (customer nodes) to H (central node) with bandwidth $B(i) = \Sigma_{j \neq i} K(j)$.

The cost of each superchannel is defined as $C(i,H) = B(i)*w(i,H)$, where w(i,H) is the distance cost plus node (i.e., regenerator) cost. For each electronic subcarrier switch site X, we calculate the total cost of n superchannels as: $C(X) = \Sigma C(j,X)$ over n sites. The site with the minimal cost is the optimal site selected as the central node (in this case, node F).

Once the central node F has been selected as the hub of the customer network, each of the customer nodes A-D are connected to the central node F via a set of superchannels (illustrated in FIG. 5 as optical links AF, BF, CF and DF) at 604. The superchannels have the same data rate in one embodiment, and different data rates in another embodiment.

At 606, network resources in the optical communication network 100 are managed between the central node F and each of the customer nodes A-D by dynamically allocating bandwidth to support communication among the nodes using the superchannels AF, BF, CF and DF.

In order to permit wavelength channel selection for the superchannels AF, BF, CF and DF, a WSS 302 at central node F performs wavelength selective switching when appropriate at 608

FIG. 7A illustrates a flow diagram to reassign spectrum in a superchannel for defragmentation. Similar to FIG. 6, the process described in the diagram may be implemented in a distributed manner using any one or more of the components and devices discussed herein. For purposes of discussion, the process is implemented by a node $X_N$.

As briefly explained above, superchannels carry data using optical carriers which are bands within the optical spectrum. That is, superchannels are formed by combining several optical carriers together. In these types of networks, an RSA algorithm may be used to setup the superchannels. The RSA algorithm considers the spectrum continuity and optical carrier consecutiveness constraints while assigning a spectrum path to any incoming connection. The spectrum continuity constraint requires continuous availability of optical carriers along an optical route.

In optical networks with dynamic traffic, the frequent set-up and tear down of optical routes can lead to significant fragmentation of spectral resources. Due to the spectrum continuity and optical carrier consecutiveness constraints, several spectrum slots in between connections remain unused thereby reducing the amount of data that can be transported within the optical network.

To overcome some of the deficiencies associated with spectral defragmentation, network resource among the superchannels may be managed by dynamically reassigning spectrum for defragmentation at 710.

At 712, a network spectrum fragmentation ratio (FR) is calculated. For example, the following formula defines the network spectrum fragmentation ratio: $FR = \sum_1^n FR(i)/n$, where n is the number of network (e.g., optical) links and the spectrum fragmentation at link i is defined as $$FR(i) = 1 - \frac{\sum_j v(G_j)}{v\left(\sum_j G_j\right)}.$$

$G_j$ is the j-th block unused slot size and $v(G_j)$ is the number of potential different superchannels (if the allowed superchannel sizes are pre-defined).

Figure 7B:
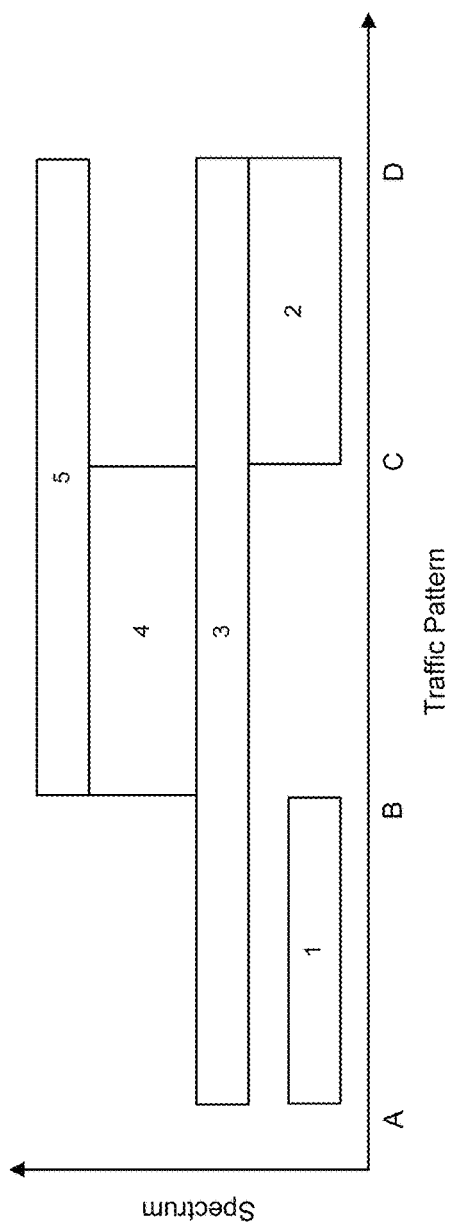
FIGS. 7B and 7C illustrate network spectrum before and after defragmentation, respectively, as processed in FIG. 7A.
Figure 7C:
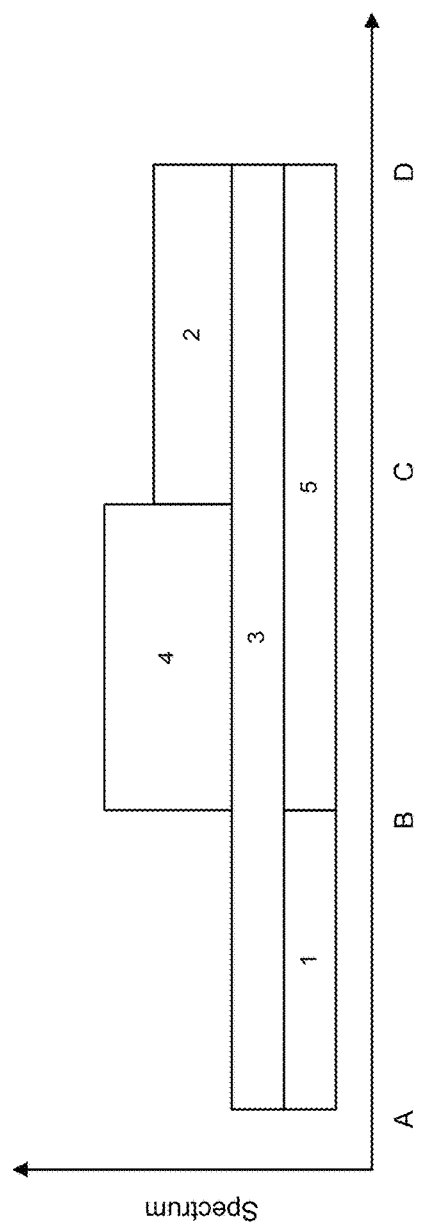

For example, FIGS. 7B and 7C illustrate network spectrum assignment before and after defragmentation, respectively, as processed in FIG. 7A. If we assume a simple linear network with four nodes and eight slots per fiber, there are five superchannels that arrive in the order of 1 to 5. A first superchannel arrives from node A to B with a spectrum requirement of 1 slot, a second superchannel arrives from node C to D with 2 slots, a third superchannel arrives from node A to D with 1 slot, a fourth superchannel arrives from node B to C with 3 slots, and a fifth superchannel arrives from node B to D with 1 slot. Since the superchannels arrive in real time, the route should be determined and spectrum assigned without knowing future superchannels.

Now let us assume for explanatory purposes that link AB has 2 unused blocks with 1 slot and 5 slots: $(G_1, G_2) = (1, 5)$. Assuming superchannels could use (1,2,3) slots, $v(G1)=1$, $v(G2)=5+2+1=8$, $v(G1+G2)=6+3+2=11$. Accordingly, $FR(1)=1-9/11=2/11$. Similarly $FR(2)=1-4/5=1/5$, $FR(3)=1-6/7=1/7$. As a result, the average network spectrum $FR = (2/11 + 1/5 + 1/7)/3 \cdot 100\% \sim 20\%$.

At 714, a threshold may be predefined such that the network continuously monitors the spectrum FR. When the FR ratio is larger than the predefined threshold, network spectrum fragmentation may be triggered.

An optimal superchannel spectrum assignment algorithm may be used to minimize the spectrum fragmentation ratio with new spectrum assignment for each of the existing superchannels at 716. This process is described in more detail with reference to FIG. 8 below.

At 718, a dependence graph is generated to identify the superchannel spectrum updating sequence order such that the superchannel spectrum updating is in "make-before-break" mode. As appreciated, in the make-before-break scenario, in which a switching device is used, a new connection path is established before the existing paths are opened (removed).

Once the sequence order has been determined and the superchannels rearranged, a command may be issued to transmitters and receivers in the optical communication network 100 to shift a central frequency according to the superchannel spectrum updating sequence order at 720.

Figure 8:
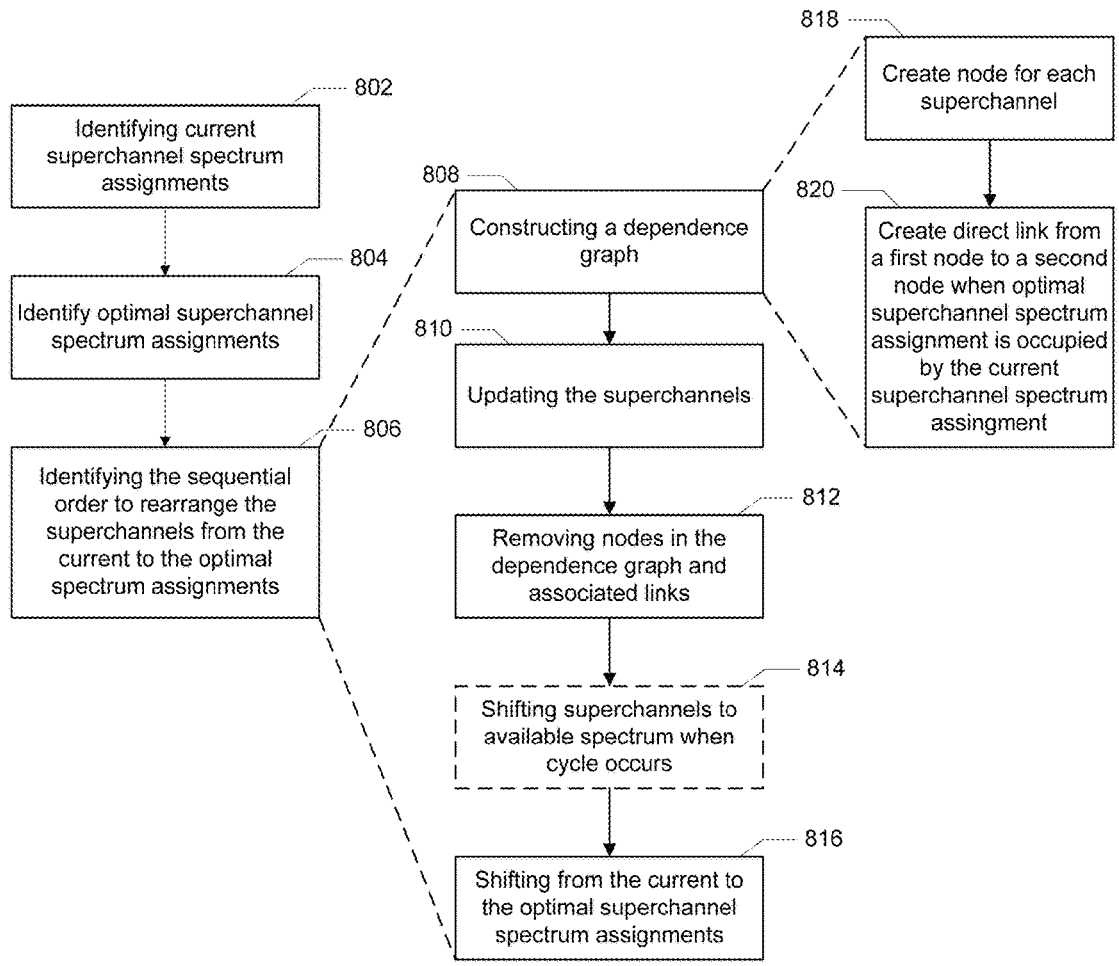
FIG. 8 illustrates a flow diagram of rearranging superchannels from a current assignment to an optimal assignment.

FIG. 8 illustrates a flow diagram of rearranging superchannels from a current assignment to an optimal assignment. The process described in the diagram may be implemented in a distributed manner using any one or more of the components and devices discussed herein. For purposes of discussion, the process is implemented by a node $X_N$.

In one embodiment, the network optimizes superchannel routing spectrum assignment using integer linear program (ILP) modeling. In another embodiment, the network optimizes superchannel routing spectrum assignment using a heuristic algorithm. Although the FR calculation detailed above may be employed, it is also appreciated that different fragmentation ratio formulas may be utilized.

At 802, the current superchannel spectrum assignments are identified. At 804, the optimal superchannel spectrum assignments are identified.

In one example, let us assume a homogeneous flexible grid optical network G(N,L), where N is the set of ROADMs and L is the set of fiber links. Each fiber link spectrum has been divided into the same width slots $S=\{1, 2, \ldots, |S|\}$. The superchannel set is $D = [(u_1, v_1, h_1), \ldots, (u_{|D|}, v_{|D|}, h_{|D|})]$, where u is the source, v is the destination, and h is the number of slots.

Since each superchannel has a fixed path, we define $Q(u,v;u',v')=1$ if path(u,v) and path(u',v') share a common fiber link, else 0. Next, we define variables where: $S_{max}$ is the highest slot number used in the assignment, x(u,v) is the starting slot number for superchannel from u to v, and $F(u,v;u',v')=1$ if $x(u,v)<x(u',v')$, else 0.

Applying the superchannel spectrum optimal assignment ILP (integer linear program) model:
Objective: Min $S_{max}$
Constraints:

$$S_{max} \geq x(u,v) + h(u,v) \qquad (1)$$

$$f(u,v) - f(u',v') \leq |S| \cdot F(u',v';u,v) \qquad (2)$$

$$f(u,v) \text{ is in } \{0, \ldots, |S|-1\} \qquad (3)$$

If $Q(u,v;u',v')=1$ $$F(u,v;u',v') + F(u',v';u,v) = 1 \qquad (4)$$

$$f(u,v) + h(u,v) - f(u',v') \leq |S| \cdot (1 - F(u,v;u',v')) \qquad (5)$$

where constraint (1) shows the objective should be the highest slot number used; constraint (2) makes sure that condition F(u,v;u',v')=1 if x(u,v)<x(u',v'), else 0 is satisfied; and constraint (3) is the starting slot. Constraints (4) and (5) ensure two superchannels sharing a common fiber do not have spectrum overlap.

Figure 9:
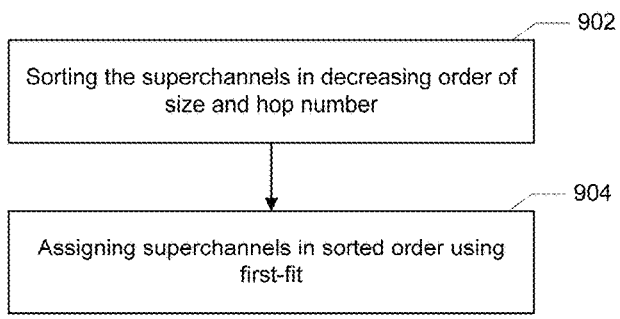
FIG. 9 illustrates a flow diagram of a heuristic algorithm in accordance with the disclosed technology.

Applying the heuristic algorithm, with reference to FIG. 9: the superchannels are sorted in decreasing number of slot and hop number (on same bandwidth) at 902. At 904, the superchannels are assigned one by one using first-fit policy, i.e., find the first smallest starting slot which fits the superchannel.

Returning to FIG. 8, after completion of the process at 802 and 804, two superchannel spectrum assignments exist—(1) the current superchannel spectrum assignments and (2) the optimal superchannel spectrum assignments. For example, FIGS. 7A and 7B illustrate a current superchannel spectrum assignment, and FIG. 7B illustrates an optimal superchannel assignment.

The process continues to 806, where the sequential order is identified to rearrange the superchannels from the current superchannel spectrum assignment to the optimal superchannel spectrum assignments. To determine the sequence order, a dependence graph is constructed based on the superchannels, where each superchannel is represented as a node in the graph at 808, as discussed with reference to FIGS. 10A, 10B and 10C.

Figure 10A:
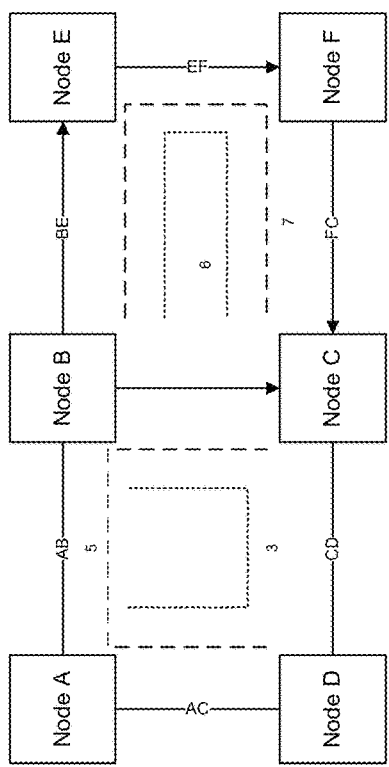
FIGS. 10A, 10B illustrate the spectrum assignment on superchannels of a current and optimal spectrum, respectively.
Figure 10B:
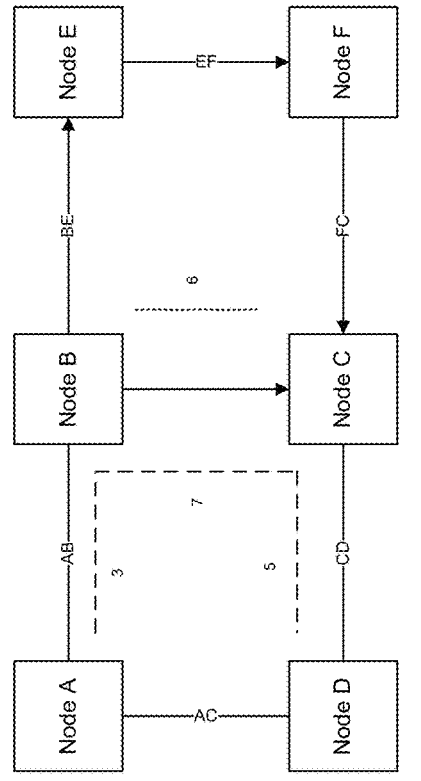
Figure 10C:
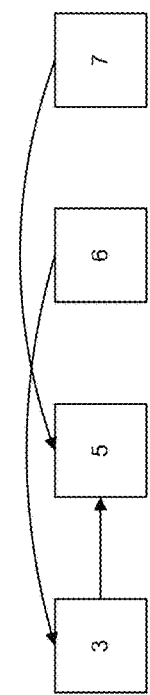
FIG. 10C illustrates a dependence graph of the superchannels to identify a shifting order.

FIGS. 10A and 10B illustrate the spectrum assignment on superchannels of a current and optimal spectrum, respectively. FIG. 10C illustrates a dependence graph of the superchannels to identify a shifting order. In the example, nodes A, B, C, D, E and F represent superchannels with 4 slots per link and numbers represent superchannel IDs. Based on the spectrum assignments, the dependence graph constructed at 808 first creates a node A-F for each superchannel at 818, and then creates a direct link from a first node to a second node when the optimal superchannel spectrum assignment is occupied by the current superchannel spectrum assignment at 820.

The resulting dependence graph is illustrated in FIG. 10C. For example, let us assume a traffic pattern arriving in the following order, where the arrival of traffic demands 2 slots: A→B arrives (1); A→B arrives (2); A→B arrives (3); A→B leaves (1); A→b leaves (2); C→D arrives (4); C→D arrives (5); C→D leaves (4); B→C arrives (6) and B→C arrives (7). The resultant current superchannel spectrum assignment is shown in FIG. 10A, where dashed and dotted lines represent remaining traffic patterns. Superchannel IDs no longer remaining are a result of the traffic patterns ending. For example, A→B arrives on superchannel IDs (1), (2) and (3) and leaves on (1) and (2)). Thus, only superchannel ID (3) remains.

FIG. 10B illustrates the optimal superchannel spectrum assignments (i.e., after ILP or heuristic algorithm) interfering with the current superchannel spectrum assignments. For example, traffic pattern D→C(5) in FIG. 10B (optimal) interferes with traffic pattern D→C (5) in FIG. 10A (current).

After determining the dependence graphs for the current and optimal superchannel spectrum assignments at 808, the superchannels are updated beginning with the superchannels without outgoing links in the dependence graphs at 810. For example, in FIG. 10C, superhcannel ID 5 does not have any outgoing link (no directed arrow from superchannel ID 5). Accordingly, superchannel 5 may be first updated.

Nodes (and associated links) representing the superchannels are removed from the dependence graph at 812 after the updating occurs at 810. In this example, the remaining superchannel node IDs are 3, 5, 6 and 7 (where superchannel node IDs 1, 2 and 4 have been removed).

If a cycle occurs in the dependence graph (i.e., a first node points to a second node which points back to the first node), the cycle requires breaking by shifting one superchannel to other available spectrum at 814.

At 816, the current superchannel spectrum assignments are shifted to the optimal superchannel assignments as they become available. For example, superchannel ID 5 is rerouted to superchannel ID 3 and superchannel ID 7 is rerouted to superchannel ID 6.

Figure 11:
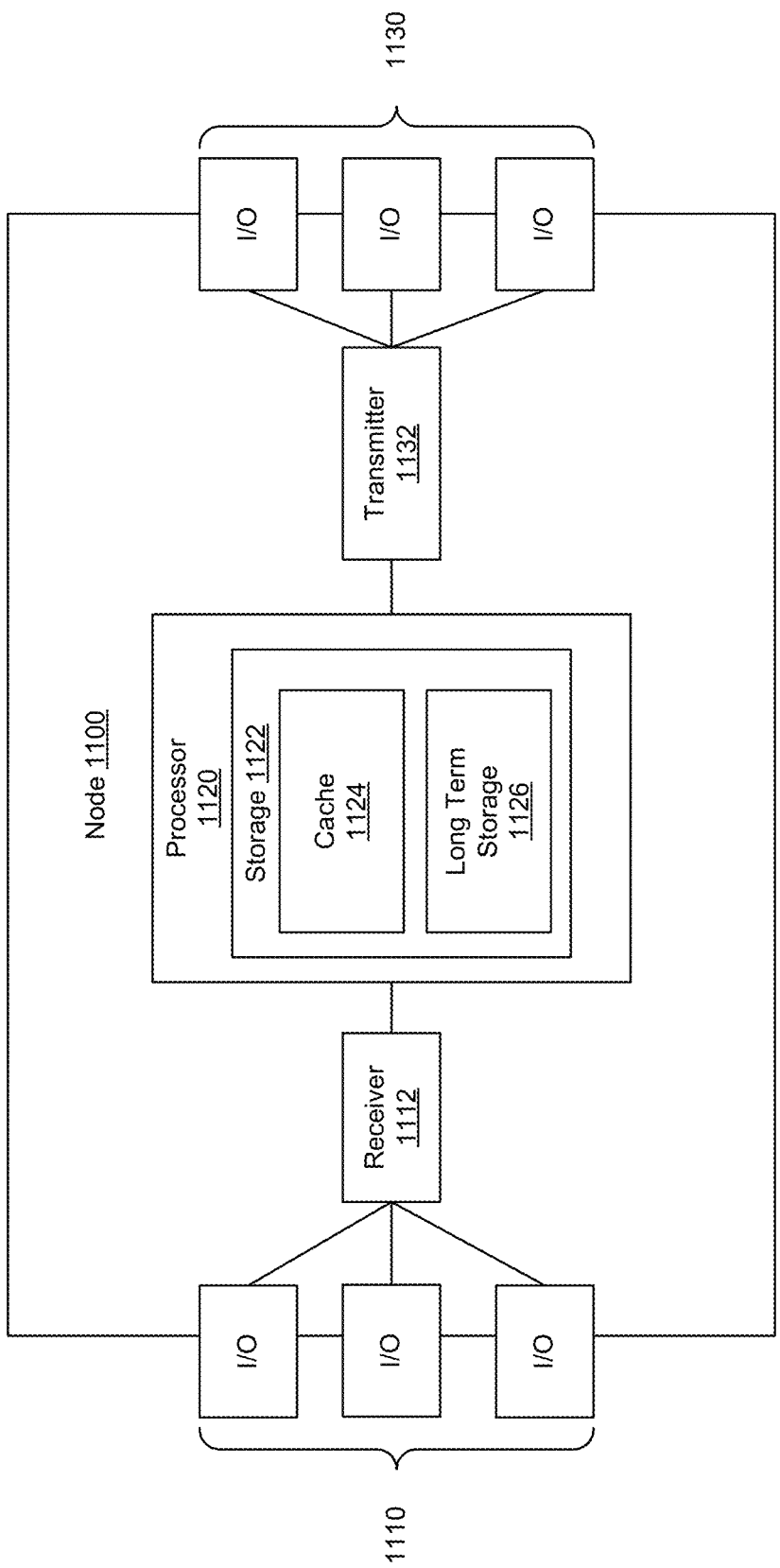
FIG. 11 illustrates an embodiment of a router in accordance with embodiments of the disclosure.

FIG. 11 illustrates an embodiment of a router in accordance with embodiments of the disclosure. The node (e.g., a router) 1100 may be, for example, the node $X_N$ (FIG. 1) or any other node or router as described above in the network. The node 1100 may comprise a plurality of input/output ports 1110/1130 and/or receivers (Rx) 1112 and transmitters (Tx) 1132 for receiving and transmitting data from other nodes, a processing system or processor 1120 (or content aware unit), including a storage 1122, to process data and determine which node to send the data. The node 1100 may also receive Interest messages and Data messages as described above. Although illustrated as a single processor, the processor 1120 is not so limited and may comprise multiple processors. The processor 1120 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1120 may be configured to implement any of the schemes described herein, such as the processes illustrated in FIGS. 6-9, using any one or combination of steps described in the embodiments. Moreover, the processor 1120 may be implemented using hardware, software, or both.

The storage 1122 (or memory) may include cache 1124 and long-term storage 1126, and may be configured to store routing tables, forwarding tables, or other tables or information disclosed herein. Although illustrated as a single storage, storage 1122 may be implemented as a combination of read only memory (ROM), random access memory (RAM), or secondary storage (e.g., one or more disk drives or tape drives used for non-volatile storage of data).

Figure 12:
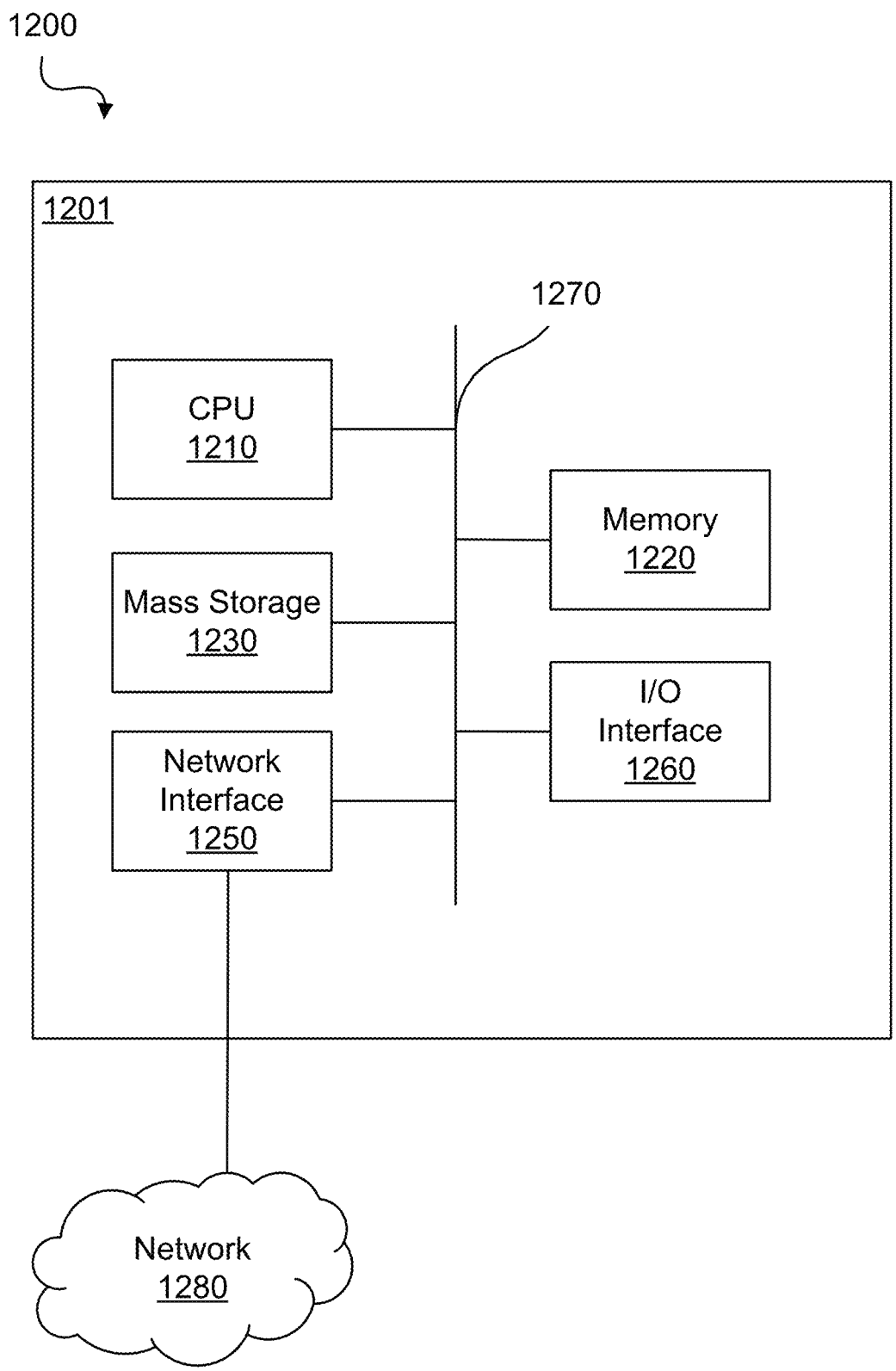
FIG. 12 illustrates a block diagram of a network system that can be used to implement various embodiments.

FIG. 12 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system 1200 may comprise a processing unit 1201 equipped with one or more input/output devices, such as network interfaces, storage interfaces, and the like. The processing unit 1201 may include a central processing unit (CPU) 1210, a memory 1220, a mass storage device 1230, and an I/O interface 1260 connected to a bus 1270. The bus 1270 may be one or more of any type of several bus architectures including a memory bus or memory controller, a peripheral bus or the like.

The CPU 1210 may comprise any type of electronic data processor. The memory 1220 may comprise any type of system memory such as static random access memory (SRAM), dynamic random access memory (DRAM), synchronous DRAM (SDRAM), read-only memory (ROM), a combination thereof, or the like. In an embodiment, the memory 1220 may include ROM for use at boot-up, and DRAM for program and data storage for use while executing programs. In embodiments, the memory 1220 is non-transitory. The mass storage device 1230 may comprise any type of storage device configured to store data, programs, and other information and to make the data, programs, and other information accessible via the bus. The mass storage device 1230 may comprise, for example, one or more of a solid state drive, hard disk drive, a magnetic disk drive, an optical disk drive, or the like.

The processing unit 1201 also includes one or more network interfaces 1250, which may comprise wired links, such as an Ethernet cable or the like, and/or wireless links to access nodes or one or more networks 1280. The network interface 1250 allows the processing unit 1201 to communicate with remote units via the networks 1280. For example, the network interface 1250 may provide wireless communication via one or more transmitters/transmit antennas and one or more receivers/receive antennas. In an embodiment, the processing unit 1201 is coupled to a local-area network or a wide-area network for data processing and communications with remote devices, such as other processing units, the Internet, remote storage facilities, or the like.

Figure 13:
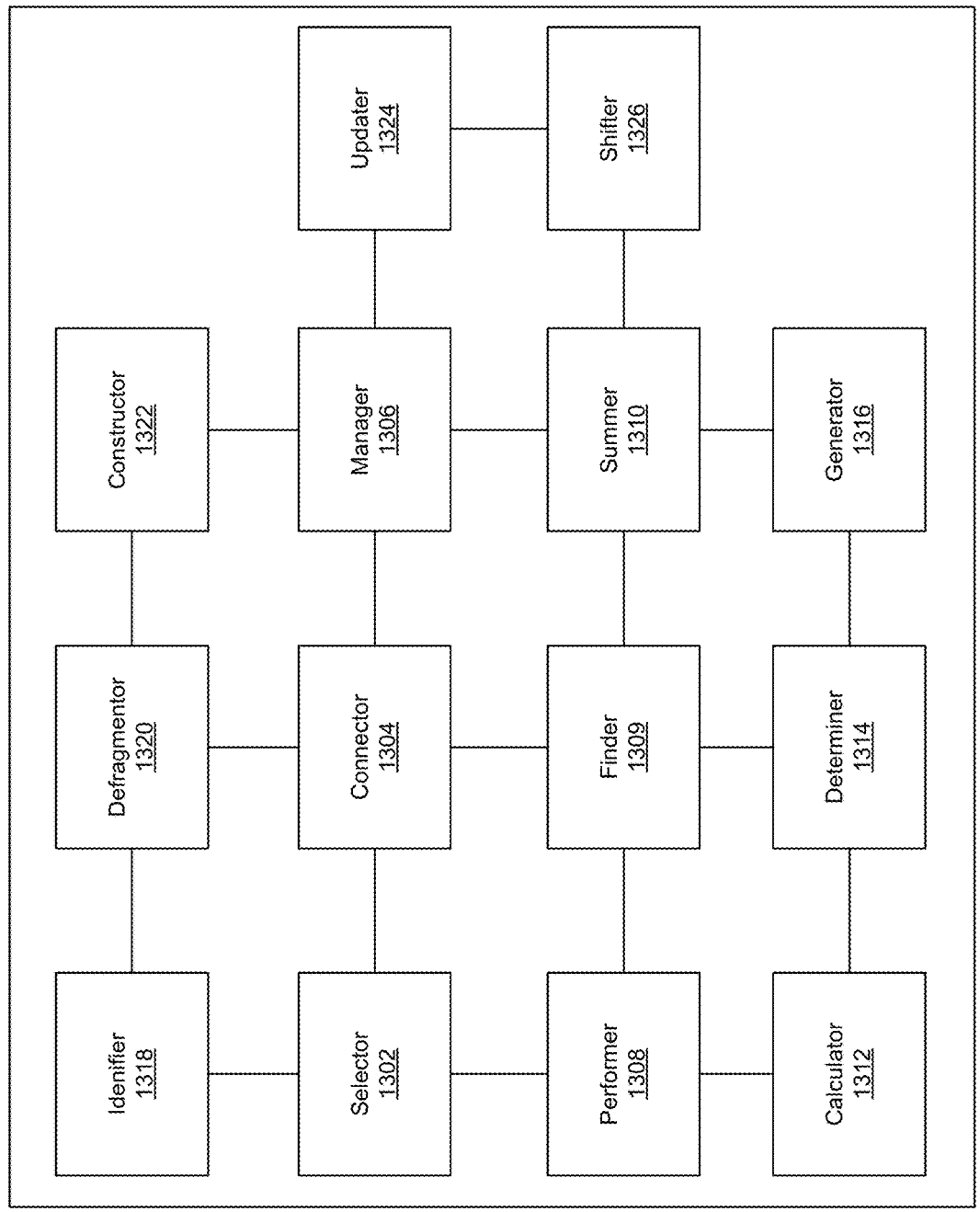
FIG. 13 illustrates a block diagram in accordance with the disclosed technology.

FIG. 13 illustrates a block diagram in accordance with the disclosed technology. Selector 1302 selects a central node among a plurality of nodes in an optical network, and connector 1304 connects each of the plurality of nodes to the central node via a set of superchannels. Manager 1306 manages network resources between the central node and each of the plurality of nodes by dynamically allocating the bandwidth to support communication among the plurality of nodes via the superchannels. Performer 1308 performs wavelength selective switching among the superchannels at the central node.

Finder 1309 finds a shortest path from the central node to each of the plurality of nodes, a summer 1310 sums a weighted shortest path from the central node to each of the plurality of nodes and the selector 1302 selects the central node having a minimal cost.

Calculator 1312 calculates a fragmentation ratio (FR) of the superchannels, determiner 1314 determines whether the fragmentation ratio is greater than a threshold and identifier 1318 identifies the superchannels when the fragmentation ratio is greater than the threshold. Defragmentor 1320 defragments the superchannels according to one of an integer linear program (ILP) model and a heuristic model and generator 1316 generates a dependence graph to identify a sequence order in which to rearrange the superchannels, where each of the superchannels represents a node in the dependence graph.

The identifier 1318 also identifies current superchannel spectrum assignments, the optimal superchannel spectrum assignments and the sequential order to rearrange the superchannels from the current spectrum assignments to optimal spectrum assignments without superchannel communication interruption.

Constructor 1322 constructs a dependence graph from the current spectrum assignments to the optimal spectrum assignments, and updater 1324 updates the superchannels beginning with the superchannels without outgoing links in the dependence graph and removes the node representing each of the superchannels and associated links after the updating. In response to any cycle in the dependence graph, a shifter 1326 shifts one or more of the superchannels to available spectrums and shifts from the current superchannel spectrum assignments to the optimal superchannel spectrum assignments when available.

The disclosed technology provides a hose model VPN with flex-grid superchannels by combining one of several algorithms to enable lowered network capital expenditure (CAPEX) and operating expense (OPEX). Several non-limiting advantages result from the disclosed technology, including but not limited to, providing a predictable and secure network for uncertainty of traffic, easy customer self-controlled VPN topology changes, superchannel spectrum efficiency and reduced spectrum fragmentation with optimized algorithm.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for constructing an optical network, comprising:
   selecting a central node among a plurality of nodes in the optical network;
   connecting each of the plurality of nodes to the central node via a set of superchannels, wherein each of the optical superchannels includes of a set of subcarriers and has a bounded data rate;
   managing network resources between the central node and each of the plurality of nodes by dynamically allocating the sub-carrier bandwidths to support communication among the plurality of nodes via the superchannels; and
   performing wavelength selective switching among the superchannels at the central node.

2. The method of claim 1, wherein the connection between the central node and each of the set of nodes is a flexible-grid connection.

3. The method of claim 1, wherein each of the superchannels include multiple wavelength channels with flexible spectrum assignment and modulation.

4. The method of claim 1, wherein each of the superchannels includes multiple wavelength channels having a same modulation format.

5. The method of claim 1, wherein the data rate of each of the superchannels is dynamically allocated to support communication among the plurality of nodes.

6. The method of claim 1, wherein the plurality of nodes of the optical network form a virtual private network (VPN).

7. The method of claim 1, wherein the central node is selected by:
   finding a shortest path from the central node to each of the plurality of nodes;
   summing a weighted shortest path from the central node to each of the plurality of nodes; and
   selecting the central node having a minimal cost.

8. The method of claim 1, wherein the central node connects at least another plurality of nodes of the optical network via at least another set of superchannels having another data rate.

9. The method of claim 2, further comprising managing the flexible grid network resources among the superchannels by dynamically reassigning spectrum to the superchannels for spectrum defragmentation.

10. The method of claim 3, wherein the minimal cost (k) is defined as: cos t(k)=$\Sigma_i$SC(i)*weight(i,k), where SC(i) is the superchannel at node i and weight (i,k) is the shortest path from i to k.

11. The method of claim 8, wherein multiple sets of the superchannels are periodically rearranged for spectrum defragmentation, wherein the spectrum degragmentation comprises defining a fragmentation parameter and assigning an operating spectrum with a least fragmentation value along the superchannels.

12. The method of claim 9, wherein the spectrum defragmentation comprises:
   calculating a fragmentation ratio (FR) of the superchannels;
   determining whether the fragmentation ratio is greater than a threshold;
   identifying the superchannels when the fragmentation ratio is greater than the threshold;
   defragmenting the superchannels according to one of an integer linear program (ILP) model and a heuristic model; and
   generating a dependence graph to identify a sequence order in which to rearrange the superchannels, where each of the superchannels represents a node in the dependence graph.

13. The method of claim 12, wherein the ILP model includes an objective function and at least one constraint corresponding to a discrete optimization problem to solve the defragmenting.

14. The method of claim 12, wherein fragmentation ratio (FR) is defined according to:

$$FR = 1 - \frac{\sum_i v(G_i)}{v\left(\sum_i G_i\right)}.$$

15. The method of claim 12, wherein the rearranging the superchannels comprises:
   identifying current superchannel spectrum assignments;
   identifying the optimal superchannel spectrum assignments; and
   identifying a sequential order to rearrange the superchannels from the current spectrum assignments to optimal spectrum assignments without superchannel communication interruption.

16. The method of claim 13, wherein the heuristic model comprises:
   sorting the superhcannels in decreasing order of size;
   sorting the superhcannels on a same bandwidth in decreasing order of hop number; and
   assigning the superchannels in sorted order using a first-fit model.

17. The method of claim 15, wherein the identifying the sequential order to rearrange the superchannels comprises:
   constructing a dependence graph from the current spectrum assignments to the optimal spectrum assignments;
   updating the superchannels beginning with the superchannels without outgoing links in the dependence graph;
   removing the node representing each of the superchannels and associated links after the updating;
   in response to any cycle in the dependence graph, shifting one or more of the superchannels to available spectrums; and
   shifting from the current superchannel spectrum assignments to the optimal superchannel spectrum assignments when available.

18. The method of claim 17, wherein the constructing the dependence graph comprises:
   creating a node for each of the superchannels; and
   creating a direct link from a first of the plurality of nodes to a second of the plurality of nodes in response to the optimal superchannel spectrum assignments being occupied by the current superchannel spectrum assignments.

19. A non-transitory computer-readable medium storing computer instructions for constructing an optical network, that when executed by one or more processors, causes the one or more processors to perform the steps of:
   selecting a central node among a plurality of nodes in the optical network;

connecting each of the plurality of nodes to the central node via a set of superchannels, wherein each of the superchannels includes a set of sub-carriers and has a same data rate;

managing network resources between the central node and each of the plurality of nodes by dynamically allocating the sub-carrier bandwidths to support communication among the plurality of nodes via the superchannels; and performing wavelength selective switching among the superchannels at the central node.

20. An optical communication network, comprising:

a plurality of nodes connected to optical links; and a network manager comprising:

a memory storage comprising instructions; and one or more processors coupled to the memory that execute the instructions to:

select a central node among a plurality of nodes in the optical communication network;

connect a set of nodes from the plurality of nodes to the central node via a corresponding set of superchannels, wherein each of the superchannels includes a set of sub-carriers and has a same data rate;

manage network resources between the central node and each of the nodes in the set of nodes by dynamically allocating the sub-carrier bandwidths to support communication among the plurality of nodes via the superchannels; and perform wavelength selective switching among the superchannels at the central node.

* * * * *